United States Patent [11] 3,607,887

| [72] | Inventors | Shinpei Gomi;<br>Masaaki Takahashi; Hiroshi Nagai, all of<br>Tokyo, Japan |
|---|---|---|
| [21] | Appl. No. | 760,971 |
| [22] | Filed | Sept. 19, 1968 |
| [45] | Patented | Sept. 21, 1971 |
| [73] | Assignee | Kureha Kagaku Kogyo Kabushiki Kaisha<br>Tokyo, Japan |
| [32] | Priority | Sept. 20, 1967 |
| [33] | | Japan |
| [31] | | 42/59916 |

[54] PROCESS FOR THE PREPARATION OF MELLOPHANIC DIANHYDRIDE
7 Claims, No Drawings

[52] U.S. Cl. .................................................... 260/346.3

[51] Int. Cl. ........................................................ C07c 63/32
[50] Field of Search ........................................... 260/346.3, 515 P, 596

[56] References Cited
OTHER REFERENCES

Organic Synthesis-Collective Volume 3 (1955) John Wiley and Sons, New York, page 807.

*Primary Examiner*—Alex Mazel
*Assistant Examiner*—Bernard I. Dentz
*Attorney*—Sughrue, Rothwell, Mion, Zinn & Macpeak

ABSTRACT: Mellophanic dianhydride is prepared by the reaction of cyclohexane-1, 2, 3, 4-tetracarboxylic acid and bromine followed by the dehydration of the mellophanic acid thus prepared.

ized at 50°–60° C., using 7 kg.
PROCESS FOR THE PREPARATION OF MELLOPHANIC DIANHYDRIDE

BACKGROUND OF THE INVENTION

1. Field of the Invention

The present invention relates to a novel process for the preparation of mellophanic dianhydride (benzene-1, 2, 3, 4,-tetracarboxylic dianhydride).

2. Description of the Prior Art

Mellophanic dianhydride is an important compound as a raw material for producing high molecular weight compounds such as polyimides and polyamides or a raw material for plasticizers but since it is very difficult to produce pure mellophanic dianhydride in large scale, the compound has not yet been manufactured in an industrial scale. On the other hand, pyromellitic anhydride (benzene-1,2,3,5-tetracarboxylic dianhydride) which is an isomer of mellophanic dianhydride has been manufactured industrially by the oxidation of durene (1,2,4,5-tetramethylbenzene) since durene is easily available. However, although mellophanic dianhydride may be formed in laboratory by the oxidation of prehnitene (1,2,3,4-tetramethylbenzene), the industrial production of mellophanic dianhydride therefrom as in the case of pyromellitic anhydride is difficult as prehnitene is not easily available.

In other words, since durene is present in a considerably high concentration in aromatic $C_{10}$ fractions obtained by a petroleum reforming or aromatic $C_{10}$ fractions obtained by the methylation of benzene, xylene and the like and also since the melting point is 79° C., the compound can be easily separated from these fractions by liquefaction and separation and is thereby easily purified. On the other hand, since the content of prehnitene in such aromatic $C_{10}$ fractions is very slight and also the melting point thereof is −6° C., the separation of prehnitene by liquefaction etc., is technically difficult as well as economically unattractive.

Furthermore, mellophanic dianhydride may also be prepared in laboratory by the oxidation of octahydrophenanthrene or 1,4-dicarboxynaphthalene with potassium permanganate. However, since such a process is low in yield, it is difficult to employ the process for industrial purposes and also since the mellophanic dianhydride prepared by the process is impure, it further requires several purification steps to obtain mellophanic dianhydride of high purity.

SUMMARY OF THE INVENTION

The inventors have, after investigation about industrial processes for producing high-purity mellophanic dianhydride for a long period of time, found that high-purity mellophanic dianhydride can be prepared from cyclohexane-1,2,3,4-tetracarboxylic acid in a good yield.

That is, it has been found that the oxidation of bicyclo 2,2,2]-5-octene-2,3-dicarboxylic anhydride prepared by the Diels-Alder reaction of 1,3-cyclohexadiene and maleic anhydride, produces cyclohexane-1, 2, 3, 4 -tetracarboxylic acid and that by using cyclohexane-1,2,3,4-tetracarboxylic acid as the starting material high purity mellophanic dianhydride can be obtained even on an industrial scale.

Therefore, an object of the present invention is to provide a novel process for preparing high purity mellophanic dianhydride on an industrial scale.

Another object of this invention is to provide an economical process for preparing high purity mellophanic dianhydride with a good yield using a raw material easily available.

These and other object of the present invention can be attained by the process of this invention. That is, according to the present invention, mellophanic dianhydride is prepared by reacting cyclohexane-1,2,3,4-tetracarboxylic acid and bromine in a solvent at a temperature of higher than 100° C., to provide mellophanic acid and then dehydrating the mellophanic acid according to a conventional manner.

DESCRIPTION OF THE PREFERRED EMBODIMENTS

The aforesaid reaction of obtaining bicyclo[2,2,2]-5-octene-2,3-dicarboxylic anhydride from 1,3-cyclohexadiene and maleic anhydride is known. For example, by reacting 1,3-cyclohexadiene and an equivalent of maleic anhydride in a solvent such as benzene under a normal pressure and at a temperature of from a normal temperature to 80° C., bicyclo[2,2,2]-5-octene-2,3-dicarboxylic anhydride is obtained almost quantitatively.

Cyclohexane-1,2,3,4-tetracarboxylic acid, the starting material in the process of this invention, can be prepared easily and with a good yield by the oxidation of the bicyclo[2,2,2]-5-octene-2,3-dicarboxylic anhydride. The oxidation of the carboxylic anhydride may be conducted with nitric acid or potassium permanganate but from an economical viewpoint the use of nitric acid is preferable.

Thus, the bicyclo[2,2,2]-5-octene-2,3-dicarboxylic anhydride is oxidized in liquid phase at a temperature of from about 40° to 150° C., and in the presence of at least about 5 moles of about 20 to 80 weight percent aqueous nitric acid per mole of anhydride. In this case, the use of more than 0.05 mole percent vanadium salt as a catalyst is preferable. This oxidation to produce cyclohexane-1,2,3,4-tetracarboxylic acid results in yields of about 75–85 percent.

When the dehydrogenation of cyclohexane-1,2,3,4-tetracarboxylic acid is conducted by a conventional catalytic dehydrogenation using palladium or platinum as the catalyst, a large amount of tar is formed and therefore the desired mellophanic acid cannot be obtained. Thus, the inventors have studied methods of conducting the dehydrogenation of cyclohexane-1, 2, 3, 4 -tetracarboxylic acid at low temperatures to obtain mellophanic acid at good yields and as a result it has been found that by oxidizingly dehydrogenating cyclohexane-1, 2, 3, 4 -tetracarboxylic acid with bromine in a solvent, mellophanic acid can be obtained easily.

That is, when cyclohexane-1,2,3,4-tetracarboxylic acid is dissolved in the solvent mentioned below in a solvent to acid weight ratio of about 2–10 and is reacted with bromine at a temperature of higher than 100° C., and preferably lower than 200° C., the dehydrogenation occurs efficiently and high purity benzene-1, 2, 3, 4 -tetracarboxylic acid or mellophanic acid is obtained at good yields.

In this case, the best result can be obtained when a ratio of about 3 molar equivalents of bromine to 1 molar equivalent cyclohexane-1,2,3,4,-tetracarboxylic acid is utilized. The solvent used in the dehydrogenation may be water or a polar organic solvent such as organic acids. Exemplary acids are acetic acid or propionic acid. The organic solvent may be used alone or in a mixture with water.

From the mellophanic acid thus obtained, mellophanic dianhydride can be easily prepared by dehydration according to a conventional manner, e.g., by heating under a reduced pressure or by using a dehydrating agent such as acetic anhydride.

The invention will be further explained by referring to the following examples:

EXAMPLE I 1.7 kg. of bicyclo[2,2,2]-5-octene-2,3-dicarboxylic anhydride, prepared from 880 g. of 1,3-cyclohexadiene and 980 g. of maleic anhydride, was oxidized at 50°–60° C., using 7 kg. of 60 percent nitric acid containing 12 g. of ammonium metavanadate. After the reaction was completed, the product was ice-cooled to form a white precipitate which was recovered by filtration and dried to provide 2.5 kg. of crude crystals. By recrystallization from a mixture of acetone and water, 2.3 kg. of cyclohexane-1,2,3,4-tetracarboxylic acid having a melting point of 167° C., was obtained.

Thereafter, 1.25 g. of the cyclohexane-1,2,3,4-tetracarboxylic acid was dissolved in 5 liters of glacial acetic acid and a solution of 2.16 g. of bromine in 2 liters of glacial acetic acid was added dropwise to the solution under reflux. The reaction occurred immediately and generated a large amount of hydrogen bromide.

After the end of the addition, the system was further refluxed for 3 hours and the product was water-cooled to form a white precipitate. The precipitate was confirmed to be high purity mellophanic acid, the melting point after drying being 239°–240° C. The yield of the mellophanic acid was 83 percent based on total cyclohexane-1, 2, 3, 4 -tetracarboxylic acid used.

By dehydrating the mellophanic acid obtained with an excess of acetic anhydride, high purity mellophanic dianhydride having a melting point of 198° C. was obtained almost quantitatively.

EXAMPLE II

In the dehydrogenation step in example I, water was used instead of acetic acid. That is, 1.25 g. of cyclohexane-1,2,3,4 - tetracarboxylic acid was mixed with 5 liters of water and the mixture heated 100° C. at atmospheric pressure. Three molar equivalents of bromine were added slowly to the mixture to cause the reaction. The reaction was very slow when compared with Example I. It took 20 hours for the bromine to be consumed.

Thereafter, the product was heated to 150° C., for about 3 hours, the resulting precipitate separated, and then recrystallized from concentrated hydrochloric acid to provide benzene-1,2,3,4-tetracarboxylic acid at a yield of 45 percent. By dehydrating the resulting tetracarboxylic acid with acetic anhydride, high-purity mellophanic dianhydride was obtained.

What is claimed is:

1. A process for the preparation of mellophanic dianhydride which comprises reacting cyclohexane -1,2,3,4-tetracarboxylic acid with bromine at a temperature of from about 100° to about 200° C. and in a solvent selected from the group consisting of water and organic acids selected from the group consisting of acetic acid and propionic acid to produce mellophanic acid and dehydrating said mellophanic acid.

2. The process of claim 1 wherein said solvent is water.

3. The process of claim 1 wherein said solvent is selected from the group consisting of acetic acid and propionic acid.

4. The process of claim 1 wherein the solvent is present in a solvent to cyclohexane-1,2,3,4-tetracarboxylic acid weight ration of about 2 to 10.

5. The process of claim 1 wherein the bromine is present in a ratio of about 3 molar equivalents to bromine to 1 molar equivalent of cyclohexane-1,2,3,4-tetracarboxylic acid.

6. The process of claim 1 wherein the cyclohexane-1,2,3,4-tetracarboxylic acid is prepared by the liquid phase oxidation of bicyclo[2,2,2]-5-ocetene-2,3,-dicarboxylic anhydride at a temperature of about 40 to 150° C., and in the presence of about 20 to 80 weight percent aqueous nitric acid, the nitric acid being present in amounts of at least about 5 moles of nitric acid per mole of dicarboxylic anhydride.

7. The process of claim 6 wherein the carboxylic anhydride is prepared by the Diels-Alder reaction of 1,3-cyclohexadiene and maleic anhydride.